United States Patent
Hudson et al.

(10) Patent No.: US 11,216,785 B2
(45) Date of Patent: Jan. 4, 2022

(54) SYSTEM AND METHOD FOR A SINGLE, UNIFIED COMMUNITY AND LEARNING EXPERIENCE

(71) Applicant: salesforce.com, inc., San Francisco, CA (US)

(72) Inventors: Emily Hudson, San Francisco, CA (US); Chris Fox, San Mateo, CA (US); Qingqing Liu, Dublin, CA (US); Asha Camper Singh, San Francisco, CA (US); Dan Chen, Palo Alto, CA (US); Matthew Rigdon, San Francisco, CA (US); Nicholas Stuart, San Francisco, CA (US); Jiahan Ericsson, Berkeley, CA (US); Joyce Yeh, San Francisco, CA (US); Samantha Ready, San Francisco, CA (US); Adam Torman, Walnut Creek, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 15/929,822

(22) Filed: May 22, 2020

(65) Prior Publication Data

US 2021/0150928 A1    May 20, 2021

Related U.S. Application Data

(60) Provisional application No. 62/937,138, filed on Nov. 18, 2019.

(51) Int. Cl.
*G06F 16/9538* (2019.01)
*G06Q 10/10* (2012.01)
(Continued)

(52) U.S. Cl.
CPC ....... *G06Q 10/109* (2013.01); *G06F 16/9027* (2019.01); *G06F 16/958* (2019.01);
(Continued)

(58) Field of Classification Search
CPC .... G09B 7/02; G06F 16/9535; G06F 16/9538
(Continued)

(56) References Cited

U.S. PATENT DOCUMENTS 5,577,188 A    11/1996  Zhu
5,608,872 A    3/1997   Schwartz et al.
(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.
(Continued)

*Primary Examiner* — Robert P Bullington
(74) *Attorney, Agent, or Firm* — Weaver Austin Villeneuve & Sampson LLP

(57) ABSTRACT

Disclosed are some implementations of systems, apparatus, methods and computer program products for implementing an electronic learning (eLearrning) system. In some implementations, an indication of a user selection by a first user of electronic learning content of an electronic learning (eLearning) system is processed, where the electronic learning content includes a learning module. Learning module is initiated or resumed. The progress of the first user in relation to completion of the learning module is tracked. An unanswered question that pertains to the learning module and that has been submitted by a second user is identified based, at least in part, on the progress of the first user in relation to the completion of the learning module. The unanswered question is then provided via a web page of the learning module for presentation via a client device of the first user.

20 Claims, 14 Drawing Sheets

(51) Int. Cl.
*G06F 16/901* (2019.01)
*G09B 5/02* (2006.01)
*G06F 16/958* (2019.01)
*G06F 16/9535* (2019.01)
*G09B 7/02* (2006.01)

(52) U.S. Cl.
CPC ...... *G06F 16/9535* (2019.01); *G06F 16/9538* (2019.01); *G06Q 10/105* (2013.01); *G09B 5/02* (2013.01); *G09B 7/02* (2013.01)

(58) Field of Classification Search
USPC ....................................................... 434/350
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven, et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,973,106 B2 | 3/2015 | Warshavsky et al. |
| 9,628,493 B2 | 4/2017 | Warshavsky et al. |
| 9,710,127 B2 | 7/2017 | Torman et al. |
| 10,049,131 B2 | 8/2018 | Torman et al. |
| 10,146,581 B2 | 12/2018 | Rapp et al. |
| 10,146,597 B2 | 12/2018 | Pack, III et al. |
| 10,223,136 B2 | 3/2019 | Torman et al. |
| 10,275,281 B2 | 4/2019 | Pradeep et al. |
| 10,296,661 B2 | 5/2019 | Sreenivasa et al. |
| 10,332,129 B2 | 6/2019 | Torman et al. |
| 10,339,126 B2 | 7/2019 | Pradeep et al. |
| 10,380,094 B2 | 8/2019 | Warshavsky et al. |
| 10,394,412 B2 | 8/2019 | Torman et al. |
| 10,592,474 B2 | 3/2020 | Torman et al. |
| 10,613,709 B2 | 4/2020 | Ready et al. |
| 10,713,066 B2 | 7/2020 | Torman et al. |
| 10,713,604 B2 | 7/2020 | Ready |

(56) References Cited

U.S. PATENT DOCUMENTS

| | | |
|---|---|---|
| 10,866,819 B2 | 12/2020 | Rapp et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0106736 A1 | 4/2015 | Torman et al. |
| 2015/0142596 A1 | 5/2015 | Jakobson et al. |
| 2015/0172563 A1 | 6/2015 | Jakobson et al. |
| 2018/0025113 A1 | 1/2018 | Torman et al. |
| 2018/0096012 A1 | 4/2018 | Warshavsky et al. |
| 2018/0096020 A1 | 4/2018 | Sreenivasa et al. |
| 2018/0096024 A1 | 4/2018 | Bitting et al. |
| 2018/0096127 A1 | 4/2018 | Purkiss et al. |
| 2018/0096130 A1 | 4/2018 | Purkiss et al. |
| 2018/0096165 A1 | 4/2018 | Warshavsky et al. |
| 2018/0096613 A1 | 4/2018 | Torman et al. |
| 2020/0201492 A1 | 6/2020 | Ready et al. |

OTHER PUBLICATIONS

U.S. Appl. No. 15/929,823, filed May 22, 2020, Reid Scott Carlberg, et al.

U.S. Appl. No. 16/699,654, filed Dec. 1, 2019, Jeff Douglas, et al.

Topics > #administrators

Topic OFFICIAL SALESFORCE TOPIC — 200

#administrators — 202

41.3k FOLLOWERS  [Follow]

A Salesforce Administrator is a business leader, deeply knowledgeable about how their company operates, intertwined in making all departments successful through process automations, and thus, integral to running a smooth & lean business.

[All Posts ▼]   [Search this feed... 🔍]

Learning — 206
Take a deep dive into this topic with learning on Trailhead

Trail
Admin Beginner
Start your #AwesomeAdmin journey by learning the basics of customizing Salesforce Trail
Admin Advanced
Reach all star admin status by tackling more advanced Salesforce features Module
Artificial Intelligence Basics
Learn what AI is and how it will transform CRM and the customer experience Share a post, Jeanette...

Jeanette Gomez  18 hours ago — 204
Disappearing phone numbers
Hello,
we are in Salesforce lightning. We have one user specifically who says that his phone number for some leads are "disappearing" the phone number will be there one day then he will go back into the lead later and it will be gone, so he has to re-add it. He is setup the same as all of our other users. Is he doing something wrong? I can't figure it out. Why would a phone number just disappear? Any help appreciated.

↩1  👍  ⭐  ↗

Francisco James  18 hours ago
Super helpful reply
Hello,
we are in Salesforce lightning. We have one user specifically who says that his phone number for some leads are "disappearing" the phone number will be there one day then he will go back into the lead later and it will be gone, so he has to re-add it. He is setup the same as all of our other users. Is he doing something wrong? I can't figure it out. Why would a phone number just disappear? Any help appreciated.

👍

Bill Rein  18 hours ago
Getting push notifications about Chatter posts, etc. on the mobile app
I can't seem to find any up-to-date advice on this although I know I may just not be seeing it... I'd like pop-up notifications from the app (or SMS text messages) when certain things happen on Salesforce, mostly thinking of Chatter here.
So if I tag someone in a Chatter post, they get a notification on their phone. I already have in-app notifications and push notification enabled in settings, but users don't get a phone ping when I tag them.

↩1  👍  ⭐  ↗

Om Prakash  18 hours ago
Hi Bill,
If in-app notifications and push notifications both are enabled from Salesforce then need to check below setting in Salesforce mobile app:
From the Salesforce app navigation menu, tap Settings Push Notification Settings.
Please refer this article for available Push Notifications to turn on accordingly:
https://help.salesforce.com/articleView?id=000194290&type=1&afdc1FrameOrigin-null If all related notifications are turned on, and still not working then need to check in mobile device notification settings itself, there might be chance that notification is off for Salesforce mobile app in device notification setting.

👍

Elizabeth Racher  18 hours ago
Really having an issue with Reports and Dashboards. Cannot get the new Lightning version to work. Help!
Does anyone know of a way that I can do a Date match in reports? For example, if Date 1 equals Date 2 I want to show that record in a report. If Date 1 and Date 2 do not match, I want to omit the record from the report.

*FIGURE 2*

In Progress
Learning – Guided paths through Salesforce topics          412

Module
    Trailhead Basics  — 406
    Get started with the fun way to learn.
    40%

414

Module
    Trailhead Playground Management — 408
    Create hands-on orgs, practice your Salesforce skills, and complete Trailhead challenges.
    40%

Posts
From your groups and topics          View all

Jeanette Gomez   18 hours ago   — 402
    Disappearing phone numbers
    Hello,
    we are in Salesforce lightning. We have one user specifically who says that his phone number for some leads are "disappearing" the phone number will be there one day then he will go back into the lead later and it will be gone, so he has to re-add it. He is setup the same as all of our other users. Is he doing something wrong? I can't figure it out. Why would a phone number just disappear? Any help appreciated.

Francisco James   18 hours ago — 404
        Always happens...
        Hello,
        we are in Salesforce lightning. We have one user specifically who says that his phone number for some leads are "disappearing" the phone number will be there one day then he will go back into the lead later and it will be gone, so he has to re-add it. He is setup the same as all of our other users. Is he doing something wrong? I can't figure it out. Why would a phone number just disappear? Any help appreciated.

*FIGURE 4A*

Hands-on Challenge — 452 — +500 points

GET READY

You'll be completing this challenge in your own personal Salesforce environment. Choose from the dropdown menu, then click Launch to get started. If you use Trailhead in a language other than English, set the language of your Trailhead Playground to English before you attempt this challenge. Want to find out more about using hands-on orgs for Trailhead learning? Check out the Trailhead Playground Management module.

YOUR CHALLENGE

Test your app in a scratch org, convert it to metadata format, then deploy it to your Trailhead Playground

You are migrating the DreamInvest app to the package development model, where your version control system is the source of truth. To achieve this, convert a project to source format in a Salesforce DX project, so you can store the source in your VCS.

- Create the project and scratch org
- Install the DreamInvest unmanaged package
- Create the appropriate permissions set
- Extract the DreamInvest package source into your project
- Convert the source, push it into a new scratch org and verify your work
- Deploy the converted DreamInvest app using the Metadata API
- Register your testing environment
- Convert from source format to metadata format and deploy the DreamInvest app to your Trailhead Playground

[ My Trailhead Playground 1 ▼ ]   [ Launch ]

[ Check challenge to earn 500 points ]

— 454

Posting Guidelines
Trailblazers, please join the community and help one another complete challenges! Posting helpful tips on what we want, posting answers will get you ticketed by one of our Rangers! Please keep it clean and civil. Full posting policy.

Jeanette, join the conversation — 456

Really having an issue with Reports and Dashboards. Cannot get the new Lightning version to work. Help!
Does anyone know of a way that I can do a Date match in reports? For example, if Date 1 equals Date 2 I want to show that record in a report. If Date 1 and Date 2 do not match, I want to omit the record from the report.

Please let me know if I need to get into more detail

   

Module　　　　　　　　　　　　　　　　　　　　+1K POINTS
Salesforce User Basics
Get started with Salesforce and learn how to make it work for your bottom line ♡ + ⊕8　　　　　　　　　　　　　　　　　　Completed 12/3/17

562

Trail　　　　　　　　　　　　　　　　　　　　+1K POINTS
Sell Lightning Fast with Sales Cloud
Learn how to use Chatter, update your profile, and start collaborating ♡ + ⊕8　　　　　　　　　　　+3 hrs left • 0/7 ▭▭▭ 🔒

Link　　　　　　　　　　　　　　　　　　　　+1K POINTS
Apex Specialist

Badge　　　　　　　　　　　　　　　　　　　　+1K POINTS
Chatter Basics for Users
Learn how to use Chatter, update your profile, and start collaborating ♡ + ⊕8　　　　　　　　　　　+3 hrs left • 0/7 ▭▭▭

Superbadge　　　　　　　　　　　　　　　　　+1K POINTS
Data Integration Specialist
Get hands-on with the features that put the "sales" in Salesforce ♡ + ⊕6　　　　　　　　　　　　　　　　　　　35 mins ∨ Show 5 Modules Masterbadge　　　　　　　　　　　　　　　　+1,000 Points
Marketing Specialist

Steve Molis
Fixer of Stuff
Denver, CO

Self Taught Admin, Psuedo Developer, Husband, Dad, LGBT Atty, Rescue Dog Owner, Animal Lover (but Cats are somewhere down between Venomous Snakes and Stinging Insects on the list). Community College Drop-Out, Geek, Formula Ninja, HopHead, Itinerant Wildlife Wranger, Stand-Up Comic, Bon Vivant. Helping make the world a better place, one Salesforce user at a time.

"In these matters the only certainty is that nothing is certain." Pliny the Elder, Roman Scholar & Scientist (23AD-79AD)

PS. If you don't like something that I say or post you can just give me a crappy Yelp review =) https://www.yelp.com/biz/steve

*606*
Skills & Achievements   My Feed

Because you asked "How do I make a custom field?"
Steve Rubin  18 hours ago
Help making a new custom field reportable
I've created a new custom field in the Opportunity object. I want to update it via the data loader. I have moved this new field into an opportunity report type that correponds to the other fields that make up the report.

↶  👍16  💬  ↗6

Your question has been answered!
Jeanette Gomez  18 hours ago
Disappearing phone numbers
Hello,
we are in Salesforce lightning. We have one user specifically who says that his phone number for some leads are "disappearing" the phone number will Trailhead — *602*

| 71 | 67k | 6 |
|---|---|---|
| Badges | Points | Trails Completed |

To reach the next level you need to earn the following badges and points:
Badges 100  Points 50,000

*604*
Trailblazer Community

Top Ranked in Trailblazer Community
2007, 2008, 2009

| 76,564 | 6,811 | 29 |
|---|---|---|
| Answers | Best Answer | Questions |
| 37 | 662 | 338 |
| Ideas | Votes | Comments |

*608*
RECENT ACTIVITY

What else do I need to know to become a swift developer
2 days ago • 3 answers

How much does Objective-C matter anymore?
6 days ago • 4 answers

I build this in the Xcode IDE – what are you using?
10 days ago • 6 answers

View All Activity

SYSTEM AND METHOD FOR A SINGLE, UNIFIED COMMUNITY AND LEARNING EXPERIENCE

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to systems and techniques associated with processing user-generated communications submitted via a website. More specifically, this patent document discloses techniques for processing user-generated communications including user questions and providing the user questions for presentation to other users within the context of an electronic learning (eLearning) environment.

BACKGROUND

"Cloud computing" services provide shared network-based resources, applications, and information to computers and other devices upon request. In cloud computing environments, services can be provided by servers to users' computer systems via the Internet and wireless networks rather than installing software locally on users' computer systems. A user can interact with a variety of systems such as social networking systems, email systems, and electronic learning (eLearning) systems, by way of example, in a cloud computing environment.

eLearning is the delivery of learning and training through digital resources. Typically, eLearning is provided through electronic devices such as computers, tablets, and cellular phones that are connected to the Internet. eLearning is a valuable tool since users can complete a course or program from any location.

BRIEF DESCRIPTION OF THE DRAWINGS

The included drawings are for illustrative purposes and serve only to provide examples of possible structures and operations for the disclosed systems, apparatus, methods and computer program products for leveraging and managing assessment environments in an assessment hub. These drawings in no way limit any changes in form and detail that may be made by one skilled in the art without departing from the spirit and scope of the disclosed implementations.

FIG. 2 shows an example of a graphical user interface (GUI) 200 configured to provide a topic web page, in accordance with some implementations.

FIG. 4A shows an example of a GUI 400 configured to provide a feed, in accordance with some implementations.

FIG. 4B shows an example of a GUI 450 configured to provide user-generated communications in relation to eLearning content, in accordance with some implementations.

FIG. 5B shows an example of a GUI 560 presenting a second portion of the custom journey of FIG. 5A, in accordance with some implementations.

FIG. 6A shows an example of a GUI illustrating a user profile page 600, in accordance with some implementations.

FIG. 6B shows an example of a GUI 640 presenting a second portion of user profile page 600, in accordance with some implementations.

DETAILED DESCRIPTION

Figure 1:
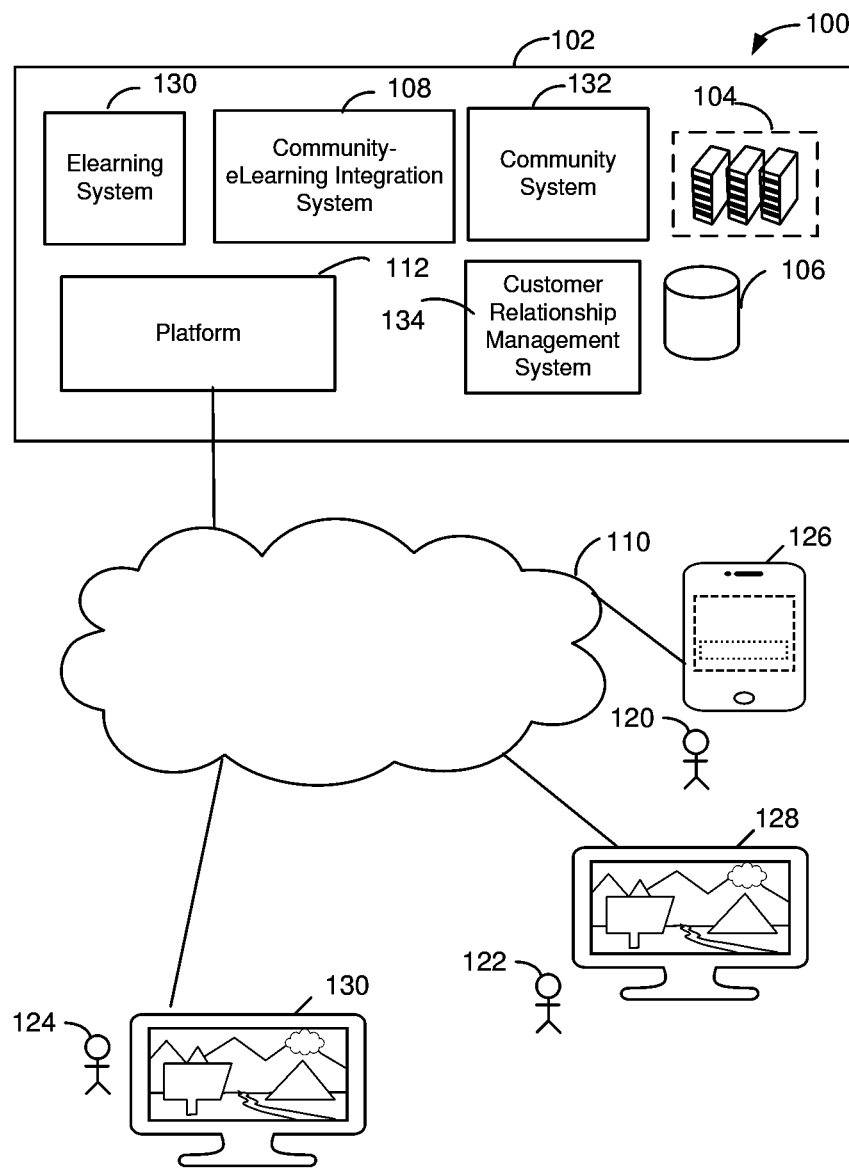
FIG. 1 shows a system diagram of an example of a database system 100 in which an eLearning system and Community system can be integrated, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for providing user-generated communications within the context of an electronic learning (eLearning) environment. User-generated communications can include questions that have been submitted by users. By providing user-submitted questions to other users within the context of an eLearning environment, this provides knowledgeable users an incentive to share their knowledge with other users, as well as the opportunity increase their visibility as an expert in their field.

Many organizations offer social media "communities," which are typically online properties in which members can relate common experiences and interests via a community web site that provides social networking and other services. These communities can serve as a platform where an organization's users can vocalize their thoughts and questions, collaborate with other users about the organization's best practices, and find users with similar interests or who are experiencing similar problems or concerns. Communities offer users a voice, a place to feel welcome, and a place to solve problems together. Users can form long-lasting networks and connections within their organizational community. Many communities offer groups and events that users can join based upon their location and interests. In addition, communities typically offer a question and answer forum.

In addition, organizations often provide electronic learning (eLearning) systems that enable users to access a variety of online learning resources via a web site dedicated to online learning. eLearning systems offer users a platform to learn about various concepts and confirm their knowledge about the concepts via assessments, which can include questions and/or hands-on "challenges" that the user can complete within the context of a real-world environment.

Typically, a user maintains multiple identities that enable the user to login separately to an organization's community system and eLearning system via independent sites. As a result, users are forced to "bounce" between eLearning and community sites that each have no knowledge of the users activity or engagement with the other site. Unfortunately, this can result in an out-of-sync and disjointed experience.

While the same users can use both the community and eLearning systems independently, neither of these systems independently enable users to find what they need for career success. As a user is spending time on an organization's eLearning system learning how to develop on or customize their organization's platform, there is no way to meet and collaborate with other users working on the same or a similar project. This is an industry wide problem for companies that provide one site for a community and another for a learning platform.

Users have a variety of tasks and goals that can be best completed if they can learn and collaborate in the same ecosystem. In accordance with various implementations, an enterprise provider can combine their social networking and eLearning sites into a single experience that unifies their community and learning experiences. A single web site can provide community and learning experiences with a continuous engagement model that proactively leverages user data to better understand the users, optimize engagement strategies, and improve the user's experience and their ability to take steps to learn and advance their careers, By combining learning and community, this supports learning feedback loops and applied learning.

In accordance with various implementations, a user can access features including those offered by an eLearning system and community system using a single identity and corresponding login. For example, the user can connect their multiple login credentials to a single identity. By logging in to a single account, the user can access features including community features and e-learning features to facilitate online learning, as described herein.

In some implementations, user posts are leveraged to improve learning experiences within an eLearning environment. More particularly, user posts such as comments, questions, or answers can be posted alongside eLearning content or associated assessments presented within an eLearning environment. In some implementations, the user posts are submitted within the context of an eLearning environment.

In accordance with various implementations, questions that have been posted by other users can be presented to a user based, at least in part, on information the system has determined that the user knows or should know. In this manner, the system can intelligently engage users based on their experience. In addition, the system can incentivize them to engage by rewarding them with points. By "gamifying" the user experience, the user can be incentivized with the potential reward of points or other recognition.

In some implementations, a computing system associated with an organization's web site can identify a user question that is pertinent to e-learning content being presented to another user who may be interacting with that e-learning content. The question can be presented to the learning user within the context of the e-Learning environment in real-time as the user is interacting with the eLearning content. In some implementations, the user question is an unanswered question for which an associated answer is not stored in a database of the system.

eLearning content can include learning module(s) that pertain to specific concepts, and the modules can be further broken down into units, similar to chapters in a book. A sequence of learning modules can be referred to as a trail. eLearning trails can be gamified, which motivates users to learn due to the casual, playful language of the content and the rewarding of points to the user as they progress along eLearning trails.

In some implementations, eLearning content can include an assessment of a user's knowledge of learning content, which can be facilitated through different types of assessments such as programmatic/technical, simulations, fill in the blank, peer review, mix and match, etc. In some implementations, an assessment can validate hands-on work completed in simulations of real-world environments to assess skills competencies that may have been learned via an eLearning platform.

In some implementations, the system provides topic-based web pages that can serve as landing pages that enable users to learn about a specific concept, collaborate about best practices and ideas, ask questions, and/or submit answers to questions of other users. A topic web page can be generated for each learning module/unit that can be completed via the web site. This enables users to post questions or answers with respect to learning modules that they are in the process of completing. In addition, these posts can be used to generate metrics for use in assessing problematic learning modules/units. Moreover, users that are more experienced can visit the topic page to ensure they remain an expert on the topic by continuously learning. Experienced users can also practice "applied learning" by answering posts that were originally submitted via a topic page.

In some implementations, user-generated communications such as user posts or tweets can be associated with corresponding topic(s). For example, where a user adds a hashtag with the topic name to a post within a user's home page or via another feed, the system can display that post on that topic's landing web page. The user-generated communication can also be stored in association with the topic.

In some implementations, eLearning content such as a module or unit is stored in association with metadata indicating a topic that is pertinent to the eLearning content. In addition, user-generated communications submitted in association with a particular topic or via a topic web page can also be stored in association with the corresponding topic. This enables user questions that are pertinent to eLearning content such as modules or units to be identified based upon topic(s) associated with the Learning content.

In some implementations, a summary of the user's achievements can be automatically updated and presented with a user profile page of the web site that is dedicated to a single user. For example, information pertaining to the user's acquired skills, credentials, certificates, degrees, and other achievements can be published via the user profile page. The profile page can reflect the user's knowledge in relation to various topics or in comparison to other users of the system. For example, a user's rank can be increased by collecting badges and earning points by successfully completing assessments in relation to a particular topic. As another example, the profile page can include information identifying the number of questions the user posted via the system, the number of answers the user posted via the system, and/or the number of questions the user answered and were voted as the best answer by other users. By publicly acknowledging the user's contributions, the user may be awarded for and encouraged to answer questions posted by other users. Moreover, by publishing this information, the user is more likely to be recognized for their achievements and advance within the organization.

By way of illustration, Adam is a new senior employee in the Accounting Department at the West Coast office of organization, Pyramid Construction, Inc. Adam has been working on performing his monthly accounting tasks but has been having problems with their current accounting system. He accesses a topic page entitled "Pyramid accounting system" and submits a question regarding the issue. His question is then posted via the topic page. Adam continues to search for a resolution on the organization's website but is unable to find any mention of the problem or its resolution.

Emily is working in the same capacity in the East Coast office and has never met Adam. She rarely accesses the organization's question-answer boards. However, she has encountered a similar issue in the accounting system. Unfortunately, Emily has not yet posted information regarding the problem on any of the topic web pages or question-answer boards.

Emily accesses the eLearning system and realizes that a new learning module on Pyramid's accounting system was added the previous day. Adam had also searched for information within Pyramid's eLearning resources. However, since he had accessed the eLearning system the day before the learning module was added, he is unaware of the added learning material. Emily starts the learning module to find a resolution for the issue in the accounting system.

The metadata associated with the learning module indicates that there are two topics associated with the learning module: "Pyramid Accounting System" and the name of the learning module, "Pyramid Accounting System—Updates." Each of the topics is associated with a web page dedicated to that topic.

While Emily is completing the learning module, the learning module presents a detailed explanation regarding a workaround for a bug in the accounting system. The system identifies unanswered questions pertaining to the topics identified in the learning module's metadata. Adam's unanswered question relating to the module is retrieved and presented to Emily via a web page that also presents documentation regarding the workaround. Emily sees Adam's question and posts an answer to the question via a user interface element such as an input box of the web page.

Adam receives an email including the answer and Emily's answer is posted on the topic web pages for both topics identified in the learning module's metadata. In addition, Adam's user profile page is updated to increment the number of questions he submitted, while Emily's user profile page is updated to increment the number of questions she has answered. Over the next several months, Emily's user profile is automatically updated to increment the number of times that the answer submitted by Emily has been voted as "best answer."

A director in the Accounting Department notices from Emily's user profile that she is an expert on Accounting concepts and practices. As a result, the manager asks Emily to perform talks to educate other employees in the Accounting Department. Emily is asked to take on further responsibilities within the Accounting Department and promoted to manager.

FIG. 1 shows a system diagram of an example of a database system 100 in which an eLearning system and Community system can be integrated, in accordance with some implementations. Database system 102 includes a variety of different hardware and/or software components that are in communication with each other. In the non-limiting example of FIG. 1, system 102 includes any number of computing devices such as servers 104. Servers 104 are in communication with one or more storage mediums 106 configured to store and maintain relevant data and/or metadata used to perform some of the techniques disclosed herein. System 102 also includes Community-eLearning integration system 108 that integrates various features of eLearning system 130 with features of Community system 132, as described in further detail below.

Storage mediums 106 can store data and metadata obtained, processed, or generated by system 102, in accordance with various implementations. More particularly, storage mediums 106 can also store feature metadata associated with content items such as eLearning content. For example, feature metadata can include, but is not limited to, content item type (e.g., eLearning module, topic recommendation, group recommendation, off-line course, etc.), pertinent topic(s), and/or pertinent user features (e.g., appropriate skill level, pertinent job role, or pertinent career). Storage mediums 106 can also store feature metadata in association with user-generated communications (e.g., posts) that are submitted via system 102. For example, feature metadata can indicate a communication type (e.g., comment, answer, question, unanswered question, tweet), communication status (e.g., submitted, answered, unanswered), a user identifier of a user that generated the communication, contact information associated with the user, relevant topic(s), and/or relevant eLearning content. User-generated communications that mention a topic can be processed by system 102 to identify the topic and system 102 can update the feature data pertaining to the user-generated communications to identify or otherwise indicate the identified topic.

Various data objects may be stored in a database of the database system in association with feature metadata. For example, data objects can include database records such as customer relationship management (CRM) records, user-generated communications, web pages, and/or eLearning content. In addition, storage mediums 106 can store eLearning content and information tracking user achievements in relation to system 102. Storage mediums 106 can also include at least one database for storing user information such as user profiles or user account information associated with users of system 102. Storage mediums 106 may further store computer-readable instructions configured to perform some of the techniques described herein.

Information stored in a user account or profile of a user can include a user email address and credentials of the user. For example, credentials of the user can include a username and password. In addition, the user account can indicate feature values of various user features, as will be described in further detail below. For example, the user features can indicate job-related information such as a job title, level, amount of experience, role of the user, and/or goal of the user, as well as associated permissions. As another example, user features can also include metadata pertaining to communications generated and submitted by the user and/or communications received by the user, as described herein.

Client devices 126, 128, 130 may be in communication with system 102 via network 110. More particularly, client devices 126, 128, 130 may communicate with servers 104 via network 110 through platform 112. For example, network 110 can be the Internet. In another example, network 110 comprises one or more local area networks (LAN) in communication with one or more wide area networks (WAN) such as the Internet. Embodiments described herein are often implemented in a cloud computing environment, in which network 110, servers 104, and possible additional apparatus and systems such as multi-tenant databases may all be considered part of the "cloud." Servers 104 may be associated with a network domain, such as www.salesforce-.com and may be controlled by a data provider associated with the network domain.

Users 120, 122, 124 of client devices 126, 128, 130 can include different users corresponding to a variety of roles and/or permissions. In this example, customer user 120 of client computing device 126 may have an account at Salesforce.com®. By logging into this account, the user can access services offered to customers. In other instances, customer user 120 does not have an account at Salesforce.com®. Employee user 122 may log into their account via client computing device 128 and access the various services provided by servers 104 to employees. For example, employee 122 may be a sales employee that accesses customer account records throughout their day as they interact with customers. User 124 can be any user and need not be an employee or customer. In some implementations, user 124 need not have an account at Salesforce.com®. Examples of devices used by users include, but are not limited to a desktop computer or portable electronic device such as a smartphone, a tablet, a laptop, a wearable device such as Google Glass®, another optical head-mounted display (OHMD) device, a smart watch, etc.

Services described herein may be offered by the data provider to various different types of users such as those having accounts with the data provider. For example, services may be provided to customer user 120, employee user 122, and/or user 124. In some implementations, Community-eLearning integration system 108 may perform achievement tracking services that track a user's achievements and update the user's profile to reflect their current achievements. In some implementations, users 120, 122, 124 of client devices 126, 128, 130 can access services via platform 112 or an application installed on client devices 126, 128, 130. More particularly, client devices 126, 128 can log into system 102 via an application programming interface (API) or via a graphical user interface (GUI) using credentials of corresponding users 120, 122, 124 respectively.

In accordance with various implementations, system 102 includes an electronic learning (eLearning) system 130 that provides eLearning services, enabling uses to learn new skills, earn credentials or certificates, and earn rewards such as points or badges. eLearning services can include system generated courses, as well as manually generated or submitted courses. Users can access services provided by any of systems 108, 130, 132 via platform 112.

eLearning resources can include eLearning content that users can read, as well as assessments that a user can complete. A user's knowledge can be assessed based upon their answers to the assessments. Community-eLearning integration system 108 can track the user's completion of system-generated courses or eLearning content such as trails or modules, as well as the success with which the user completes the eLearning content. Success can include an amount of progress and/or accuracy of completion of eLearning content or system-generated courses. During completion of an assessment, a user can perform one or more hands-on assessment tasks within the context of an organization with which they are familiar Assessment tasks can include, for example, writing a segment of computer code, modifying data within a data record, or generating a new data record. An assessment environment corresponding to the organization can have an associated database that replicates data maintained by the organization, as well as the hierarchical structure of the data maintained by the organization. For example, data associated with an insurance company can include customer data, account data, and insurance plan data.

In some implementations, eLearning resources including assessments are presented in the form of learning trails within the context of a game. Learning trails can include modules that are organized in chronological order in which they are to be completed by users. Upon successful completion of an assessment question or task, the user may be presented a corresponding message via a display of their device. System 108 may award a user points, badges, a certificate, credential, degree, or other form of recognition that signifies the successful completion of an assessment, learning path, module, or system-generated courses. A summary of the user's achievements can be published via a web page that can be accessed by the user and/or other individuals, as will be described in further detail below. In some implementations, the user's achievements can be tracked via a profile web page associated with the user.

In some implementations, Community system 132 provides social media communities and related social-networking services. For example, Community system 132 can provide dedicated user profile web pages, social networking feeds, and topic-specific web pages. A topic-specific web page can pertain to a topic such as a general topic, an organization-specific topic such as a specific job role within the organization, a group, specific eLearning content, and/or location. For example, a topic web page can be dedicated to independent learning modules, learning trails, system-generated learning courses, assessments, and/or specific questions within an assessment.

In some implementations, user data gathered via c Community-eLearning integration system 108, eLearning system 130, Community system 132, and/or customer relationship management (CRM) system 134 can be processed to obtain user feature values pertaining to various user features. User data can be gathered implicitly based upon users' interactions with services such as those provided by system 108, eLearning system 130, Community system 132, and/or CRM system 134, as well as data explicitly provided by users to these systems. For example, user interactions can include, but are not limited to, ownership of or interactions with database records of CRM system, interactions with feed items, interactions with eLearning content, and/or interactions with topic-specific web pages. The user data can include data gathered by the system with respect to various web sites and services. The feature values obtained or derived from the user data can then be analyzed and applied according to various implementations, as described herein. For example, feature values pertaining to user features may be processed via machine learning algorithm(s). Machine learning models that are generated using machine learning algorithms can be applied to facilitate processes performed by any of systems 108, 130, 132, 134.

In this example, systems 108, 130, 132, 134 are represented independently. However, it is important to note that systems 108, 130, 132, 134 represent functional aspects of system 102. Therefore, any of systems 108, 130, 132, 134 may be implemented separately or in combination with one another in an integrated system.

Data associated with systems 108, 130, 132, 134 may be stored independently or in combination in data stores 106. Systems 108, 130, 132, 134 can communicate with one another to obtain user data or feature values via various communication mechanisms such as Application Programming Interfaces (APIs). In some implementations, system 108 communicates with Community system via an API to obtain or identify questions, answers, and/or other user-generated communications submitted via Community system 132. For example, Community system may be queried via an API for user-generated communications such as unanswered questions pertaining to a particular topic. Similarly, communication between system 108 and eLearning system 130 may be facilitated via one or more APIs to provide unanswered questions for presentation to users via eLearning system 130.

In some implementations, system 108 includes a custom course generation and achievement tracking system of system 102 that identifies a list of content items for use in generating a custom course for a user. System 108 can transmit the list via an API to eLearning system 130, which can generate the custom course using the list of content items. The custom course is assigned to the user. In some implementations, the custom course generation and achievement tracking system is integrated with systems 130, 132, 134.

In some implementations, a user of platform 112 may have a single authorization identity. In other implementations, a user of platform 112 may have two or more different authorization identities, which can be associated with any of systems 108, 130, 132, 134. This can allow multiple modes of access to systems and associated services, which can be based on private authorization or public authorization. For example, one authorization identity can be a set of access credentials based on a profile of Community system 132. The other authorization identity can be a set of access credentials associated with an eLearning platform of system 102 that provides access to eLearning resources via eLearning system 130. In some implementations, platform 112 can query the set of access credentials from Community system 132 and map those credentials and/or permissions with credentials associated with eLearning system 130.

User-generated communications pertaining to a topic can be submitted by a user and/or accessed by a user via web pages of the web site. In some implementations, the web pages include a topic-based web page.

A web page such as a topic page or home page can include content items of various content item types/event types. Content items can include eLearning content such as recommended or in-progress eLearning content. More particularly, eLearning content can include an individual eLearning module or trail that includes a list or sequence of eLearning modules. eLearning content can also include articles, documents, or assessments that include questions (e.g., multiple choice) and/or hands-on challenge tasks to assess the user's knowledge on a topic within the context of a real-world environment.

Content items can also include or identify a recommended topic, user-generated posts including questions and/or answers pertaining to a particular topic, recommended events (e.g., pertaining to a topic), or identification of leaders/experts who are receiving "best answer" recognition for an answer to a question about a particular topic. For example, a content item may recommend that the user follow a user who is an expert on a topic. Content items can also include credentials or certifications that relate to the topic, groups that relate to the topic, documentation that provides assistance or training on the topic, knowledge articles pertaining to the topic, blogs about that topic, etc.

FIG. 2 shows an example of a graphical user interface (GUI) configured to provide a topic web page 200, in accordance with some implementations. Topic web page 200 is configured to enable users to access and submit user-generated communications pertaining to a corresponding topic. By accessing topic web page 200, users can access content pertaining to a topic, as well as post comments, questions, and/or answers via the corresponding web page dedicated to that topic. Topic-specific web pages can provide capabilities such as filtering, sorting, and/or search capabilities, enabling a user to quickly identify topic-specific information that they seek. In addition, social networking services can enable users to submit subscriptions to follow specific topics by submitting a request via the corresponding topic web page.

In this example, GUI presents a topic web page 200 pertains to the topic, "administrators." In some implementations, a user can post a question 204 pertaining to the topic by interacting with topic web page 200. Another user can then choose to post an answer to question 204 via topic web page 200. However, a question may remain unanswered for an extended period of time.

Metadata stored in association with a question can indicate whether the question has been answered. For example, user questions that have not yet been answered can be flagged in a database as being unanswered. This enables the system to prioritize unanswered questions submitted via the system for presentation to other users of the system via topic web page 200, another web page, or another communication mechanism.

In some implementations, a topic web page can provide a feed including user-generated communications pertaining to the topic. For example, the system can render content items such as social media posts pertaining to the topic via the corresponding topic web page, where the topic is identified in the social media post (e.g., via a hashtag).

Topic web page 200 can be further configured to provide a segment presenting additional content items 206 pertaining to the topic. In this example, content items include recommended learning content.

Figure 3:
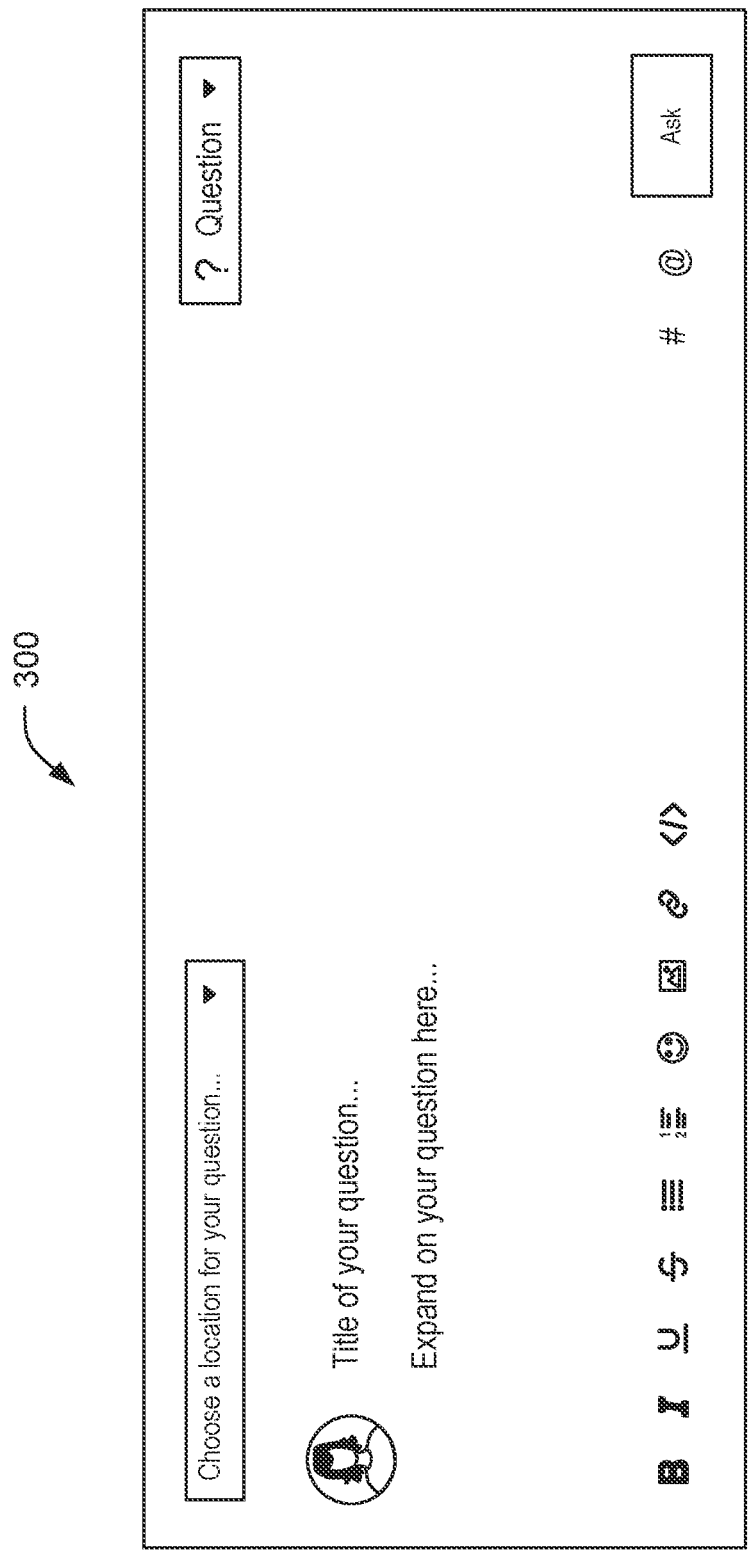
FIG. 3 shows an example of a GUI 300 configured to receive user-generated questions, in accordance with some implementations.

User-generated questions can also be submitted via a GUI that is independent from a topic-web page. FIG. 3 shows an example of a GUI 300 configured to receive user-generated questions, in accordance with some implementations. In this example, the user can choose a location for their question. For example, a user can submit a question pertaining to a topic or group. The question can be stored in association with the topic or group, as selected by the user. In addition, the question can be stored in association with metadata such as an identifier and/or contact information of the user that posted the question.

A feed that is rendered via a home page can also facilitate the submission and publishing of user-generated communications including questions and answers. FIG. 4A shows an example of a GUI 400 configured to provide a feed, in accordance with some implementations. After the user logs in, the user can view a list of personalized content items in a feed, which can be presented via the user's home page. The feed can include user interface elements representing content items, as well as posts including questions 402 and/or answers submitted by users. In some implementations, the user can configure a set of filters so that the home page shows the type of content items/events that the user is most interested in reading.

Content items presented within the feed can include eLearning content, as well as other types of content, as will be described in further detail below. As shown in this example, the feed can enable a user to interact with various feed items such as system-generated custom courses, eLearning modules or trails via associated user interface objects such as buttons.

In some implementations, a user interface element of a feed represents a system-generated personalized journey or course that has been generated for a user. For example, a user interface element can include a content item representing a system-generated personalized journey "Become a Salesforce Administrator." A system-generated custom course/journey can include a list of content items that together represent a recommended path toward achieving the user's goals. The recommended path can include a recommended sequence of actions that the user can take toward achieving the user's career goals. More particularly, the recommended path can serve as a "To-Do List" including a sequence of events that are recommended for becoming a Salesforce Administrator. The user can interact with an associated user interface object/component such as a button, rendered within GUI, to start or resume their custom course and progress along the recommended path. The custom course/journey can then be provided for presentation to the user via a client device. An example custom journey will be described in further detail below with reference to FIGS. 5A and 5B.

As shown in this example, content items can include user interface elements representing learning content such as recommended or in-progress learning modules or trails/sequences that are not identified in the user's custom course. The user can start or resume a corresponding eLearning module or trail by clicking on a user interface object rendered within a corresponding user interface element of GUI 400. In this example, content items identifying two in-progress modules, Trailhead Basics and Trailhead Playground Management, are represented by corresponding user interface elements 406, 408. A user can interact with an associated user interface object to start or resume the corresponding learning module/trail, as shown at 412, 414.

In some implementations, user-generated communications including questions and/or answers can be submitted via interaction with the feed. For example, a user can submit a question or answer via a post or comment 404 on a post. In addition, the feed can include questions and/or answers that have been submitted via another web page or GUI and selected for presentation to the user via the user's home page. For example, content items presented within the user's feed can include posts originating from groups that the user has joined and posts from users that the user is following. In this example, posts 402 including user questions and/or associated answers pertaining to a particular topic or group are rendered within the feed.

In some implementations, questions and any associated answers can be displayed in another segment of a web page independent from the feed rendered via the web page. For example, questions can be rendered in a right-hand side of the web page along with any associated user-generated answers.

In some implementations, user-generated communications (e.g., posts) such as unanswered questions are presented to a potential answering user within the context of an eLearning environment. FIG. 4B shows an example of a GUI 450 configured to provide user-generated communications in relation to eLearning content, in accordance with some implementations. After a user has started an eLearning module, trail, or custom course/journey, the system can execute the corresponding computer-readable instructions to provide a web page that includes content 452 of the eLearning module, trail, or custom course/journey, as well as user-generated communication(s) that the system determines are relevant to the eLearning module trail.

In this example, content provided via a learning module, during execution of the learning module, pertains to the Sales Cloud. More particularly, as shown in FIG. 4B, the content can include an assessment task such as a hands-on assessment task that the user completes within the context of a real-world environment. Segment 454 of GUI 500 can include user-generated communications pertaining to the learning module. For example, segment 454 can include user-generated question(s) and/or answer(s) pertaining to the Sales Cloud.

User-generated question(s) presented within segment 454 can include answered or unanswered question(s) submitted by other user(s). As described herein, users can submit questions within the context of a learning module or external to an eLearning environment.

Segment 454 can be distinct from a region of GUI 450 that includes learning content. In this example, segment 454 is shown at the bottom of GUI 450. However, segment 454 can be presented within other locations within GUI 450. For example, segment 454 can be presented in one or more locations of GUI 450, which can include a left side, right side, bottom, or upper portion of GUI 450.

In this example, segment 454 includes an unanswered question 456 submitted by another user. The user completing the learning module can submit an answer to question 456 by interacting with a user interface element of segment 454. The user can post an answer to the question, for example, by posting a reply or comment on question 456. In some implementations, user-submitted questions can be presented via a feed and a user can post an answer to a question, which can be presented in real-time in association with the question.

In some implementations, the system identifies relevant question(s) and/or answer(s) and provides the identified question(s) and/or answer(s) for presentation within segment 454. More particularly, the system can determine relevance of question(s) and/or answer(s) to metadata associated with eLearning content such as an eLearning module, trail, or a system-generated course. Metadata pertaining to user features of a potential answering user can also be used to determine relevance of question(s) and/or answer(s) to that user. An example of a method of providing user-generated communications within an eLearning context will be described in further detail below with reference to FIG. 7B.

In some implementations, the system automatically generates a personalized course that is personalized for a specific user and includes a list of content items. The list of content items can be provided for presentation to a user via a client device, for example, via a web page or GUI, that is provided for presentation via the client device. A personalized system-generated course or feed can be generated based, at least in part, on the user's goals and/or other features specific to the user such as topics of interest or level of experience. The system can intelligently generate custom courses or feeds that include items that are most likely to be pertinent to the user and their goals. Thus, the user no longer needs to search multiple sites to find what they need to pursue their goals. In addition, the system can provide a custom course or feed when it will be most likely to benefit the user.

Data can be collected as users complete various learning modules, trails, and/or system-generated courses. An example of a system-generated course will be described in further detail below.

In some implementations, a custom course operates in a similar manner to a syllabus or curriculum. However, a custom course is not limited to educational topics or units. Rather, the custom course can identify specific actions that the user should take to achieve a particular goal. The user can click on a "Start" button to begin a custom course or journey. In response, the system can provide a custom course in the form of a custom list or feed that includes information or content items that are relevant to the user's goal or other user characteristics.

Figure 5A:
FIG. 5A shows an example of a GUI 530 presenting a first portion of a custom journey that has been automatically generated for a user, in accordance with some implementations.

A custom course can be presented via web page(s) rendered on a display of a client device. FIGS. 5A and 5B together illustrate an example of a custom journey that can be system generated, in accordance various implementations. Figure 5A shows an example of a GUI 530 presenting a first portion of a custom journey, entitled "Become a Salesforce Administrator, that has been automatically generated for a user, in accordance with some implementations. The system can provide the custom course in the form of a list of content items for presentation on a user's home page or profile page. Each of these content items can identify or correspond to a particular action that is to be taken by the user.

In this example, the content items correspond to a custom path/journey toward becoming a Salesforce administrator. More particularly, the custom course is represented by a plurality of user interface elements that each corresponds to a different content item. As shown in Figure 5A, each user interface element can include a corresponding segment of the web page. For example, the segment of the web page can include a horizontal portion of the web page. As shown in this example, content items 532 can include recommended groups, topics, users to follow, recommended mentors, and/or recommended mentees.

In some implementations, the order in which the content items are listed represents the recommended order in which the actions should be completed by the user. However, he user can choose to complete the actions in a different order from that in which the content items are presented to the user via a client device. In other implementations, the order in which the content items are listed represents the order that the actions are to be followed by the user to successfully complete the course.

An individual user interface element representing a content item can have an associated user interface object with which the user can interact to perform an action represented by the content item. For example, the user can click on a button to join a group or follow a topic. As another example, the user can start or resume a learning module or learning trail by interacting with a corresponding user interface object. In response, the system can provide access to a corresponding web page via a hypertext link or other mechanism. The user may be rewarded with a specific number of points for completing various actions, as indicated in the respective user interface elements.

FIG. 5B shows an example of a GUI 560 presenting a second portion of the custom journey of FIG. 5A, in accordance with some implementations. The user can scroll up or down to view content items within their custom course. As the user scrolls down to view further content items in the custom course, additional user interface elements 562 representing various content items such as learning modules, learning trails (e.g., paths or sequences), links, badges (can be displayed, as shown in FIG. 5B. In some implementations, a badge or a specific number of points may be awarded after the user has successfully completed a sequence of learning modules and an assessment including hands-on tasks that teach and assess the user's skills and knowledge in a real-world environment using data relevant to the organization. A badge (e.g., super badge or master badge) can represent a certification or credential such as Data Integration Specialist.

The user's achievements can be tracked in association with the user, as well as represented visually within the content list of the custom course. Upon successful completion of a corresponding action, an indication of the successful completion can be represented within or in close proximity to the user interface element.

It is important to note that the examples described herein are merely illustrative and any number and types of content items/course items can be presented in a computer-generated custom course. Moreover, since a custom course is generated for a specific user, the number and types of content items will typically vary from user to user.

For example, the content items can also include a recommended onsite or off-site learning course or event. The user can register with a recommended course or event by interacting with a corresponding user interface object such as a "Register" button. The user can similarly interact with user interface objects to start recommended learning modules/trails or resume in-progress learning modules/trails. For content items such as those pertaining to learning modules or trails, an estimated time that it will take the user to complete can be displayed in the corresponding user interface element. For in-progress learning modules, a percentage of completion by the user of the corresponding learning modules can presented in the corresponding user interface element.

FIG. 6A shows an example of a GUI illustrating a user profile page 600, in accordance with some implementations. The user's profile can be accessed via a corresponding Uniform Resource Locator (URL). In some implementations, the URL can be accessed via the public domain unless the user or another individual has configured their profile to be private or accessible according to specific user permission settings.

In some implementations, the user's goal can be presented on the user's profile page, enabling potential employers to identify prospective employees for advancement within the organization. In some instances, a goal can pertain to the user's career or more specifically to the organization. For example, a user's goal can include a particular career, a particular business role, a particular job position, a particular set of one or more skills, a particular credential, or a particular certification.

In addition, the user's profile page 600 can track the user's progress with respect to eLearning content and/or system-generated courses, as well as any associated achievements. The user's profile page can serve as a valuable tool for both the user and potential employers. As shown in this example, the profile can integrate aspects of eLearning system 130 and Community system 132 of FIG. 1. By integrating the learning system and community system into a single experience, the system provides resources that enable users to reach their full potential within an organization. Since other users can access the user's profile page, this enables these users to view a quick summary of the user's knowledge, skills, achievements, experiences, and goals. The profile page can be automatically updated based upon the user's interactions with database system 102, which increases the reliability of the user information made available to potential employers. As a result, the user profile can serve as an automatically generated objective resume, which can increase the likelihood that the user will reach their goals and eliminate the need for a user to manually prepare a more traditional resume. The user profile can include any number of segments. The segments shown in FIG. 6 are merely illustrative, and other types of information can be presented in various combinations within a profile page.

As shown in this example, a first segment 602 of the profile page can be configured to provide information pertaining to the user's experience with eLearning system 130 and a second segment 604 of the profile page can be configured to provide information pertaining to the user's experience with Community system 132. Information rendered within segment 602 pertaining to the learning system can include, for example, the number of badges earned by the user, the number of points earned by the user, and/or the number of learning trails completed by the user. Segment 602 can also indicate next steps that the user can perform to advance within the organization or achieve their goal(s).

Segment 604 can include metadata pertaining to user-generated communications such as questions, answers, comments, or other posts. For example, the metadata can include information indicating the number of questions submitted by other users of database system 102 that the user has answered, the number of times that the user's answer is voted as the best answer, the number of questions the user has submitted via database system 102, the number of ideas the user has submitted via database system 102, the number of votes the user has received (e.g., in association with a "best answer"), and/or the number of comments the user has submitted.

Further segments of the profile page can include or represent skills and achievements and/or recent activity, represented by segments 606 and 608, respectively. Skills and achievements can include any skill or achievement of the user pertaining to their experience with database system 102. Skills and achievements can include information pertaining to the user's progress with respect to a custom course. For example, segment 606 can identify the custom courses the user has completed, the user's progress toward completion of a custom course, specific skills they have acquired via various learning modules or trails, and/or identifiers of specific learning modules or trails that the user has started and the user's progress toward completion. The user can scroll down to view the remaining segments of the profile page.

Figure 6B:
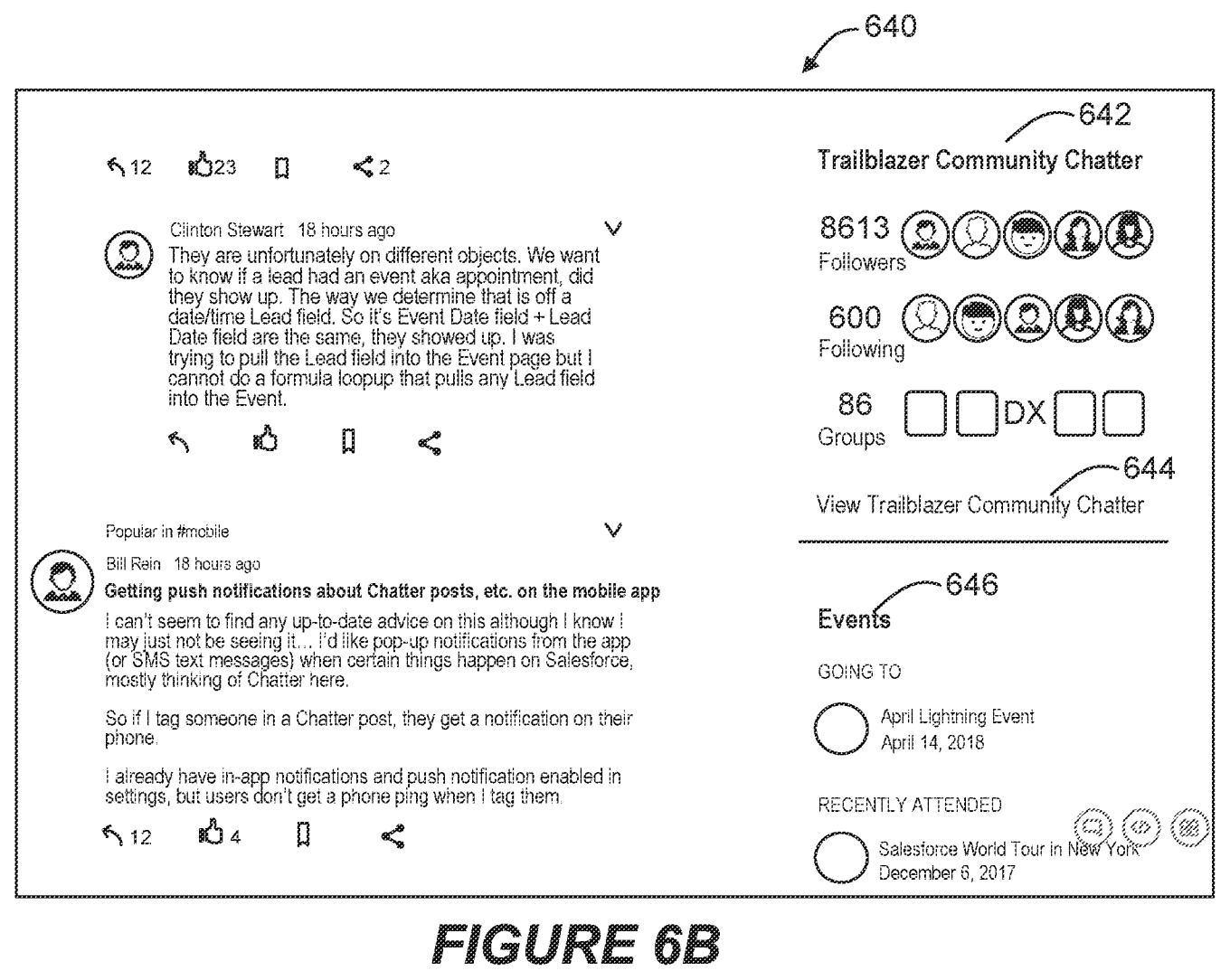

FIG. 6B shows an example of a GUI 640 presenting a second portion of user profile page 600, in accordance with some implementations. Segment 642 provides information pertaining to and/or access to a social network of the organization. For example, segment 642 can indicate the number of followers of the user, the number of other users that the user is following, the number of groups of which the user is a member, and/or the topics that the user is following. Segment 644 can enable the user to access a social network feed via the social network. Segment 646 can identify events that the user attended, as well as the events the user is planning to attend.

Figure 7A:
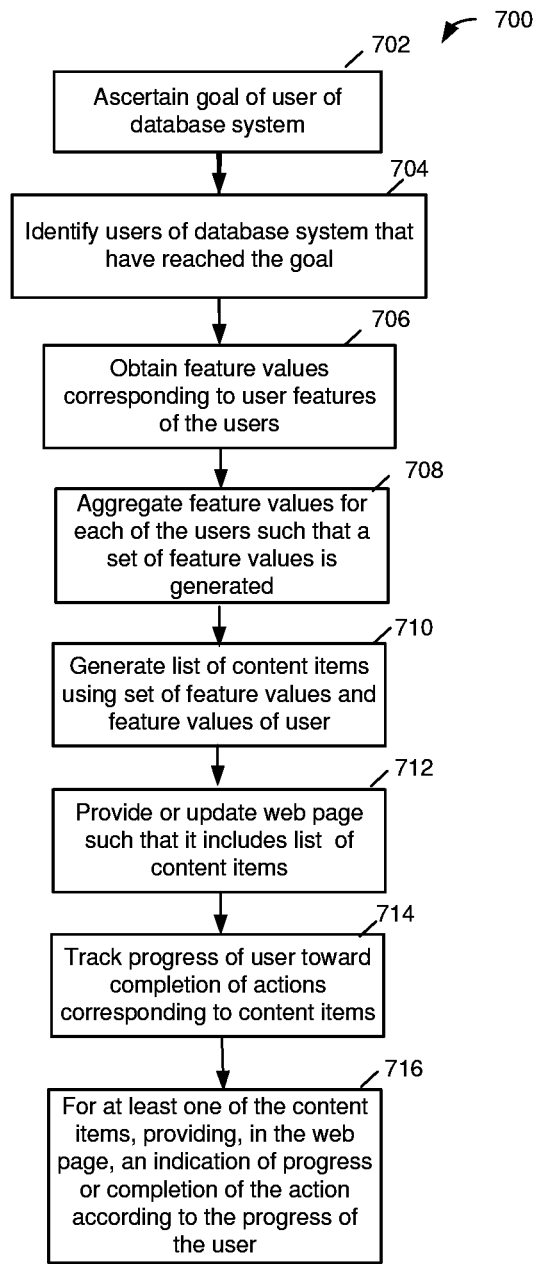
FIG. 7A shows an example of a method 700 for generating a custom journey, in accordance with some implementations.

FIG. 7A shows an example of a method 700 for generating a custom journey, in accordance with some implementations. To generate a custom journey, the system can ascertain a goal of a user of a database system at 702. In some implementations, the system can ascertain a goal of the user based, at least in part, on an indication of user input received from a client device. In other implementations, the system can ascertain a goal of the user based, at least in part, on user feature data of the user stored in at least one database, where the user feature data includes one or more feature values corresponding to one or more user features.

The user features of a given user of the database system can include, but are not limited to, a history of interaction of the user with database records such as: an article, document, or blog; CRM records stored in a database of the database system; a history of interaction with content items rendered in a web page, a history of interaction of the user with eLearning content such as a learning module or that is accessible via the web site and with which the user has interacted; an amount of progress of the user with respect to eLearning content that is accessible via the web site and with which the user has interacted; a credential or certification that has been obtained by the user; a current job position; a prior job position; a career; a set of skills; an amount of experience; one or more user goals; an indication of whether the user goals have been achieved; a level of progress or completion of a system-generated course designed to assist the user in achieving a particular one of their user goals; a level of accuracy or success with which user progresses in relation to eLearning content or a system-generated course, a group that is accessible via the web site and of which the user is a member, a particular user that the user is following via the web site, a particular topic that is being followed by the user via the web site, a topic web page that has been accessed by the user via the web site, and/or a post of the user that has been published via the web site. The user features can further indicate any additional content items with which the user has interacted or custom course items that have been completed by the user.

User features can also include user-generated communications, as well as metadata pertaining to questions, answers, comments, or other user-generated content posted by the user via the web site. For example, user features can include a question that has been posted by the user via the web site, an answer that has been posted by the user via the web site in response to a question that has been posted by another user, a number of questions posted by the user via the web site, a number of answers posted by the user via the web site, and/or the number of times the user's answer has been voted as the best answer.

User features can also include demographics and/or topics the user is interested in. Topics that the user is interested in can include those that have been explicitly indicated by the user and/or those that have been implicit and derived by the system. Demographics of a user can include, but are not limited to, age, gender, home location, and/or work location.

The system then identifies users of the database system who have achieved the goal at 704. This can include, for example, accessing user goal information stored in a database of the database system. Specifically, the goal information can include a mapping between user identifiers and user-specific goal(s). For example, the goal information can identify or otherwise indicate user-specific goal(s) for at least a subset of the users of the database system. In some implementations, the system selects a subset of the identified users based upon shared user characteristics/feature values.

The system obtains, for each of the users, a corresponding plurality of feature values corresponding to a plurality of user features at 706. The feature values can be obtained from user feature information stored in at least one database. In some instances, feature value(s) can be derived based, at least in part, on a history of interaction of the users with the database system and/or other feature values. For example, feature values can indicate interactions of users with custom courses, levels of progress or completion of custom courses, and/or whether they reached their goal.

The system aggregates the feature values for each of the users such that a set of feature values corresponding to the users is generated at 708. The set of feature values can be stored for retrieval by the system for generation of a custom course.

The system generates a custom course in an automated fashion. This can alleviate the burden on administrators and other users tasked with educating their employees in an efficient and thorough manner.

As shown in FIG. 7A, the system generates a custom course including a list of content items for the user based, at least in part, on the set of feature values corresponding to the users and feature values of the user that correspond to the user features at 710. In addition, the custom course can be generated further based, at least in part, on content item/course item feature values associated with content items/course items. The custom course can be generated in real-time responsive to a user request such as the submission of answers to a set of onboarding questions. The list of content items can be identifiable by one or more data objects stored in a database.

The system can generate the list of content items based, at least in part, on a dependency tree indicating dependencies among content items/course items such as a plurality of electronic learning resources stored in an electronic learning repository. As described herein, the electronic resources of the electronic learning repository can include learning modules or learning module sequences. The dependency tree can be beneficial for identifying suitable content items to present to the user, as well as the order in which content items are presented.

In some implementations, the custom course is generated by applying a machine learning algorithm to a training data set including the set of feature values corresponding to the users such that at least one machine learning model is generated. As described above, feature values for a given user can indicate content items/course items completed by the user. In some implementations, the machine learning model is further generated using content item/course item feature values associated with content items/course items completed by the users. A machine learning model that has been generated can include one or more equations that include a plurality of variables representing user features and course item features, as well as numerical values including coefficients of the equations.

The list of content items can be generated for the user by applying the machine learning model to the plurality of feature values of the user. The list of content items can be generated further based, at least in part, on course item feature values of the content items/course items completed by the user and/or course item feature values of potential content items/course item(s). For example, the machine learning model can be applied for the user fir each potential content item/course item. Those content items/course items having the highest value can be selected for use in generating the user's custom course.

In some implementations, the system generates the custom course such that it includes a minimum, maximum, and/or specified number of course items having a particular set of course item characteristics (e.g., course item type). For example, the system can generate a custom course such that it includes one recommended group, one recommended topic, and at least one recommended learning module or learning trail.

The system can provide the custom course for display by a client device. In some implementations, the system provides or updates a web page for display by a client device of the user such that the web page includes a plurality of user interface elements representing the list of content items at 712, where each of the user interface elements corresponds to a different one of the plurality of content items. The web page can include, for example, a home page or profile page. Thus, the web page can be associated with the user.

In some implementations, at least one content item in the list of content items represents a recommended learning module or a recommended sequence of learning modules. The list can further include one or more additional content items such as a recommended credential or certification, a recommended job position, a recommended career, a link, a group that is accessible via the web site and recommended for the user to join, a recommendation to follow a particular user via the web site, a topic that is recommended for the user to follow via the web site, a recommended event, and/or a recommended off-site course. At least one of the content items can have an associated user interface object displayable within or in close proximity to the corresponding user interface element.

In some implementations, the user can interact with content items in the list via corresponding user interface objects. For example, the user can interact with a user interface object to start or resume a corresponding learning module trail; As another example, the user can interact with a user interface object to sign up for an off-site event or course, follow a topic or user, or join a group. For various content item types/event types, the system can enable the user to mark a content item as completed.

The system tracks the progress of the user toward completion of actions corresponding to the content items in the list of content items at 714. In some implementations, the system tracks the user's progress based, at least in part, on interaction by the user with the list of content items. For example, the system can process an indication of user input representing an interaction by the user with at least one user interface object of the web page corresponding to one of the content items/user interface elements.

In some implementations, user interface objects are user-selectable and the user interacts with the user interface object by selecting (e.g., clicking on) the user interface object. User interface objects can include, for example, buttons, tabs, or menus.

For some content types/event types, responsive to processing an indication of user selection of a user interface object, the system can perform or complete the corresponding action. For example, where the user selects a button to follow another user or join a group, the system can add the user to the group or as a follower to another user. The system can then update, in a database, metadata associated with the custom course to reflect the completed action for that content item.

For some content item types/course item types, responsive to processing an indication of the user selection of a user interface object corresponding to a particular content item, the system can provide a second web page associated with the particular content item. For example, the system can enable the user to start or resume a learning module or trail. As another example, the second web page can enable the user to sign up for an off-site course. The system can store or update metadata as the user completes the learning module or trail.

In addition, the system can track the user's progress with respect to individual content items independently from the custom course. For example, the system can track the progress with respect to corresponding learning modules or learning trails independently from the web page and update the list within the web page as the user completes the corresponding learning content. This can be performed, for example, using an Application Programming Interface (API) of a module, trail, or eLearning system. As another example, the user can complete an action corresponding to a content item and the system can receive notice of the action's completion via a poll or pull method. This can occur, for example, where a user completes an action outside the context of the web page/list, such as where notification of attendance of an off-site event is received from the creator of the event.

In some instances, the progress with respect to a content item can be tracked automatically. In other instances, such as where an off-site event is identified, the user can submit input via a user interface object to indicate that the action has been completed for the corresponding content item.

The tracking of the user's progress can also include assessing the user's performance with respect to various content items. For example, the user's performance can be assessed based upon the results of learning assessments that the user has completed or is in the process of completing. The user's performance can be ascertained, for example, via an API of eLearning system 130.

The system can store or update metadata reflecting the user's progress with respect to the custom course in a data object stored in a database. Similarly, the system can store or update information reflecting the user's progress with respect to individual content items in one or more data objects stored in a database. The system can subsequently update the information to indicate whether the user was successful in reaching their goal after completing a custom learning module or a portion thereof.

For at least one of the content items in the list, the system provides, in the web page for display by the client device, an indication of progress or completion of the corresponding action by the user according to the progress of the user at 716. For example, the system can provide an indication of whether the action was started or completed. For learning modules and sequences, the system can provide an indication of the amount (e.g., percentage) that has been completed. The system can also provide, in the web page, an indication of the level of the user's performance with respect to the custom course or specific content items. The system can award the user a certificate, credential, degree, badge(s), points, or other reward upon successfully completing the custom course.

In some implementations, the system continues to identify further content items that would assist the user in achieving their goal after the custom course has been generated and/or provided for presentation to the user via a client device. More particularly, the system can identify further content items as additional online resources or course items are added to the system and/or as additional user feature data for the user or other users is collected. An additional content item identification process can be performed periodically or in response to a trigger such as the addition of resources or content items to the system and/or collection of additional user feature data for the user or other users is collected.

In some implementations, a set of rules is applied to determine circumstances in which to add new content items to the custom course, as well as which types of content items/course items to add to the custom course. The set of rules can also be used to determine whether to add a new content item to the custom course or a separate feed. This can prevent endless updates to the user's custom course, which can lead to user frustration.

For example, if the user's performance with respect to the custom course falls below a threshold level, the custom course can be modified to include additional content item(s). The user's performance can be assessed based, at least in part, on the accuracy of the user's answers to assessments provided by learning modules or learning module sequences identified within their custom course. Additional educational resources such as learning modules or learning module sequences can be identified based upon the user's performance. More particularly, the system can identify learning module(s) or sequences that would help the user gain skills or knowledge that the system determines the user is lacking based upon their answers to assessments. Alternatively, if the user's performance with respect to the custom course exceeds a minimum threshold level, the system can add additional content items to a separate feed.

The system can generate or update a machine learning model used to identify content items as it gathers new information, either about current users of the system or new users of the system. The system can continue to apply the machine learning model to identify new content items for a given user, as described herein.

In some implementations, the web page or associated custom course can be published via a network for access by other users. The web page or custom course can also have associated permissions that govern whether the web page is published or otherwise accessible by other users, either within the organization or outside the organization. The permissions can indicate a set of individuals that is permitted to access the web page or custom course. The permissions associated with the custom course or web page can be configurable by the user and/or other individual(s) such as the user's manager or supervisor to limit accessibility to the web page.

In some implementations, aspects of the user's progress or completion of the custom course can be provided for display in another web page such as the user's profile page. For example, the profile page can indicate a level of progress toward completion of the course, as well as any certification, credential, degree, badge(s), or points awarded upon completion of the course. As another example, the profile page can indicate skills that have been acquired by the user upon completion of a custom course or individual custom course item. The profile page can be published via a network for access by individuals within the organization, individuals outside the organization, and/or a particular set of individuals. The profile page can have associated permissions that govern whether the profile is published or otherwise accessible, as well as govern which individuals are permitted to access the profile page. The permissions associated with the profile page can be configurable by the user.

As described above, a user can submit a question that can be answered by another user. The question can be submitted while engaging with eLearning content. For example, the user can post a question during completion of a learning module or assessment. In other instances, the user can submit their question via a topic-specific web page pertaining to the eLearning content (e.g., module), by transmitting (e.g., posting) a user-generated communication that includes the question and identifies the topic (e.g., via the use of a hash tag), by posting the question via a question-answer board or user feed, or by submitting their question via a user interface configured to receive user questions.

Unfortunately, users often don't have the time to read questions that other users have posted via organizational question-answer boards or web pages. In accordance with various implementations, the system presents a user-generated communication such as user-generated question to other user(s) who are likely to be able to answer the question. By providing unanswered user questions within the context of an eLearning environment to individuals likely to be able answer those questions, users are more likely to be engaged and interested in answering other users' questions. Because the questions are presented within the eLearning context, this also increases the probability that users will have the requisite knowledge to answer the question. In addition, by offering rewards such as points or badges to a user submitting an answer to an unanswered question, the user can be further motivated to help other users learn. Moreover, by actively applying their knowledge, the answering user's knowledge is reinforced. A user profile page can be automatically updated based upon the answering's user's efforts and achievements, which further rewards the answering user with organizational visibility and prospective career advancement. A method for processing user-generated communications will be described in further detail below.

Figure 7B:
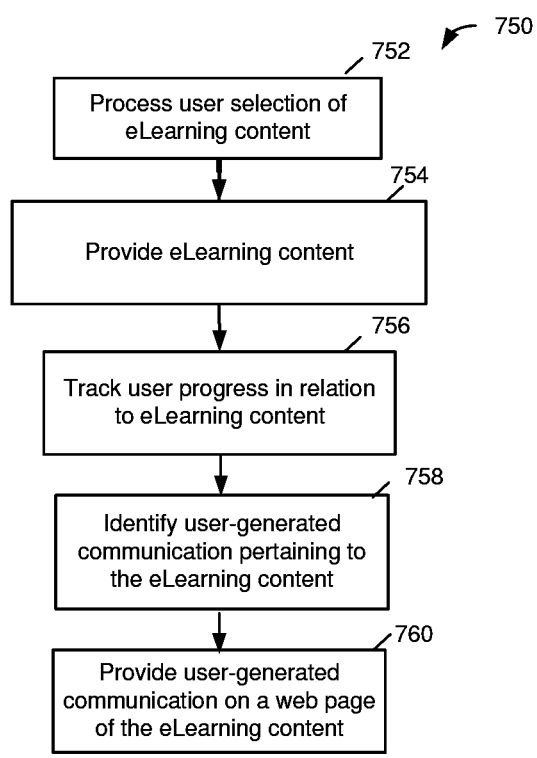
FIG. 7B shows an example of a method 750 for providing user-generated questions within the context of an eLearning environment, in accordance with some implementations.

FIG. 7B shows an example of a method 750 for providing user-generated questions within the context of an eLearning environment, in accordance with some implementations. An indication of a user selection, by a first user, of eLearning content of an eLearning system is processed at 752, where the indication of the user selection is received from a client device. In some implementations, the eLearning content can include an eLearning module which provides one or more content items. In some implementations, the eLearning module includes computer-readable code that, when executed, provides one or more content items such as documentation and/or an assessment, as described herein.

Responsive to processing the indication of the user selection, the eLearning content is provided at 754 for display at a client device of the first user. For example, the system can initiate or resume the learning module by providing one or more of a plurality of content items of the learning module for presentation by the client device.

User progress of the first user in relation to completion of the eLearning content is tracked at 756. For example, the system can track an amount of progress and/or an accuracy with which the user progresses in relation to completion of the eLearning content, as described herein.

One or more user-generated communications pertaining to the eLearning content are identified at 758. In some implementations, the user-generated communications are identified based, at least in part, on the progress of the first user in relation to the completion of the learning module. More particularly, the system can determine whether the first user has accessed the eLearning content, the amount of progress in relation to the eLearning content, and/or the success of the first user in relation to the eLearning content. This amount of progress in relation to the eLearning content can be measured via a percentage or amount of the eLearning content completed by the user. For example, the amount of progress can indicate the percentage or number of segments (e.g., units) or web pages of eLearning content the user has viewed. The amount of progress can also be measured via a percentage or amount of assessment(s) completed by the user. For example, the amount of progress can indicate the number of assessment questions or tasks that the user has completed. The success of the first user can also be measured by the accuracy with which the user completes the eLearning content (e.g., learning module, assessment, or associated question(s)/task(s)). For example, success can be measured by the percentage of an assessment that the user has completed correctly, and/or the number of assessment questions or tasks that the user completed correctly.

The user-generated communications can be also be identified based, at least in part, on additional feature value(s) of the first user that pertain to one or more user features. For example, features such as level of experience (e.g., junior, senior, number of years), job role, level of progress, and/or success in relation to completing other eLearning content can be used to identify the user-generated communications.

In addition, the user-generated communications can be identified based, at least in part on metadata stored in association with the eLearning content and metadata stored in association with a plurality of question(s) stored in at least one database of the database system. For example, the system can query a database to identify the unanswered question that pertains to the learning module from a plurality of questions submitted via the database system based, at least in part, on metadata indicating characteristics of the learning module.

In some implementations, metadata indicating topic(s) associated with the eLearning content can be identified and a database including a plurality of questions submitted via the database system by users of the database system can be queried for unanswered questions pertaining to the topic(s). The topic(s) can be associated with corresponding topic web page(s). As described herein, a topic web page can correspond to the eLearning content or a portion thereof. For example, the topic can identify the learning module and/or an assessment question/task of the learning module.

In some implementations, the user-generated communications that are identified include one or more questions that pertain to the learning module and that have been submitted by a second user. For example, the questions can include one or more unanswered questions.

The identified user-generated communications can then be provided for display on a client device of the second user at 760. More particularly, the user-generated communications can be provided for presentation on a web page of the learning module. The user-generated communications can be presented in a segment of the web page. For example, an article, document or other eLearning content can be rendered in one portion of the web page (e.g., left side of the web page), while the user-generated communications can be rendered in another portion of the web page (e.g., right hand side of the web page).

In accordance with various implementations, the system can identify user-generated communications in real-time, enabling the system to provide recently submitted user-generated questions to prospective answering users. As users continue to submit user-generated communications via the database system, those communications can be processed, stored in association with corresponding metadata such as related topic(s), and provided for display via a client device of another user.

In some implementations, a user-generated communication can be submitted by a user while interacting with eLearning content provided via an eLearning system and the system can present that communication in real-time to another user who is also interacting with the eLearning system. For example, two different users may be accessing the same eLearning content such as an eLearning module, where the second user submits a question while completing eLearning content and the firsts user is presented the question while completing the eLearning content.

A user can apply their learning immediately to prove their knowledge and showcase their skills by answering another user's question. In the event that the first user submits an answer to the question, the system processes the answer, stores the answer in association with the question, and provides the answer for presentation by a client device of the second user. More particularly, the system can transmit the answer to the second user via an electronic message such as an email. In addition, the system can update web page(s), provided for presentation via a client device of the second user, to include a post that includes the answer and/or metadata associated therewith. For example, the web page can be a web page provided by the learning module for presentation by a client device of the second user while the second user completes the learning module, a topic web page associated with a topic to which the question pertains, a feed rendered on the second user's home page, and/or user profile page(s) of the first and/or second user. For example, a user profile page of the second user can be updated to indicate that their question was answered, while a user profile page of the first user can be updated to increment the number of questions that they answered.

By processing user-generated answers to questions of other users that have been obtained within the context of an eLearning environment, this allows for troubleshooting and sharing applications of a particular concept. Moreover, productivity and collaboration can be linked so users can truly master the content and reinforce learning. In addition, this allows users to apply their leanings in the same forum they are consuming content by answering questions of other users.

A user who takes the time to respond to another user's question may be rewarded for their efforts. More particularly, the answering user can be awarded points or a badge. In addition, the answering user's efforts can simply be acknowledged by the system by thanking that user for their efforts. The system can provide these forms of rewards privately or the system can publicize the user's question answering achievements by automatically updating that user's profile page or a feed presented via that user's home page. For example, the answering user's profile page can be updated to reflect the number of questions the user answered and/or the number of times the user's answer was voted "best answer." In this manner, the system encourages users to interact and help each other learn. By automatically updating a summary of the user's question answering achievements via a forum that can be accessed by other users, the system enables the user to exhibit their knowledge in a way that enhances their online resume or profile that is visible via the unified Community and Learning site.

The system can apply a set of rules that limits circumstances in which an answer is provided responsive to a user-submitted question. For example, where a user is completing an assessment, the system can choose not to provide a corresponding answer in order to prevent the user from cheating on a question or task. Therefore, the system can facilitate providing answers to user-submitted questions while also preventing abuse of this service.

The above-described examples refer to the presentation of user-generated communications such as unanswered questions within the context of an online eLearning environment. However, these examples are merely illustrative. Therefore, the disclosed implementations can also be implemented via a mobile application installed on a mobile device.

Some but not all of the techniques described or referenced herein are implemented using or in conjunction with a social networking system. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, CRM services and other database management services, any of which can be accessed and used in conjunction with the techniques disclosed herein in some implementations. In some but not all implementations, these various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization.

For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described below. The information updates can include various social network data from various sources and can be stored in a database system. In some but not all implementations, the disclosed methods, apparatus, systems, and computer program products may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail below, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can be otherwise generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned below, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail below. A feed can be a combination of social media messages and feed tracked updates. Social media messages can include text created by a user and/or other data. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 8A:
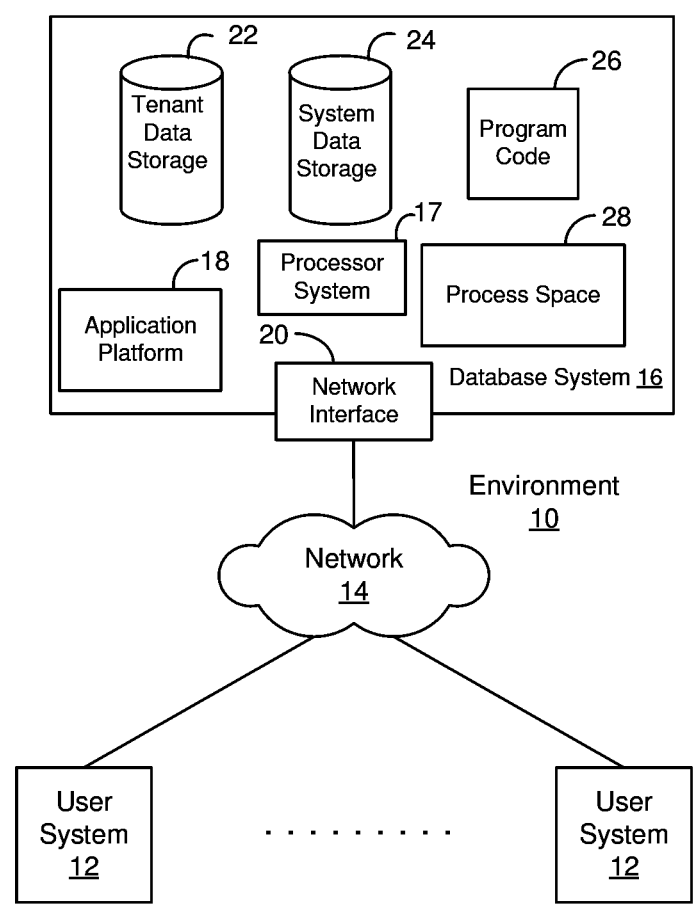
FIG. 8A shows a block diagram of an example of an environment 10 in which an on-demand database service can be used in accordance with some implementations.

FIG. 8A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 8A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 8B:
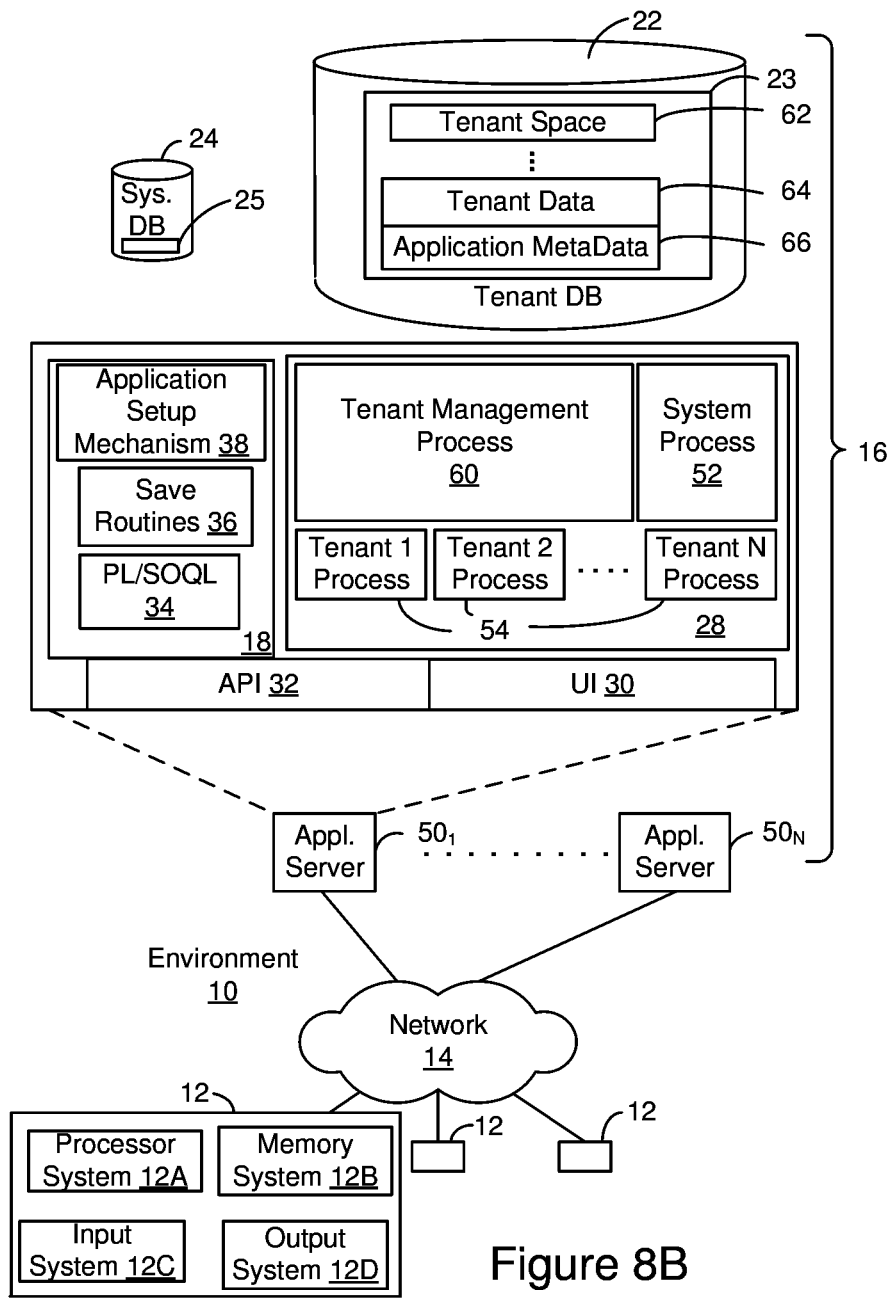
FIG. 8B shows a block diagram of an example of some implementations of elements of FIG. 8A and various possible interconnections between these elements.

FIG. 8B shows a block diagram of an example of some implementations of elements of FIG. 8A and various possible interconnections between these elements. That is, FIG. 8B also illustrates environment 10. However, in FIG. 8B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $SO_1$ might be coupled via the network 14 (e.g., the Internet), another application server $SO_{N-1}$ might be coupled via a direct network link, and another application server $SO_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an FS Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9A:
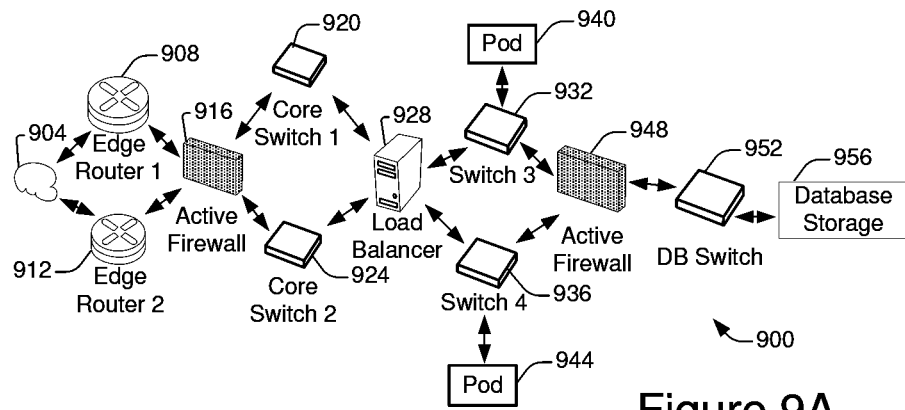
FIG. 9A shows a system diagram of an example of architectural components of an on-demand database service environment 900, in accordance with some implementations.

FIG. 9A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 8A and 8B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 8A and 8B, some implementations of an on-demand database service environment may include anywhere from one to many devices of each type. Also, the on-demand database service environment need not include each device shown in FIGS. 8A and 8B, or may include additional devices not shown in FIGS. 8A and 8B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 9B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 9A and 9B.

Figure 9B:
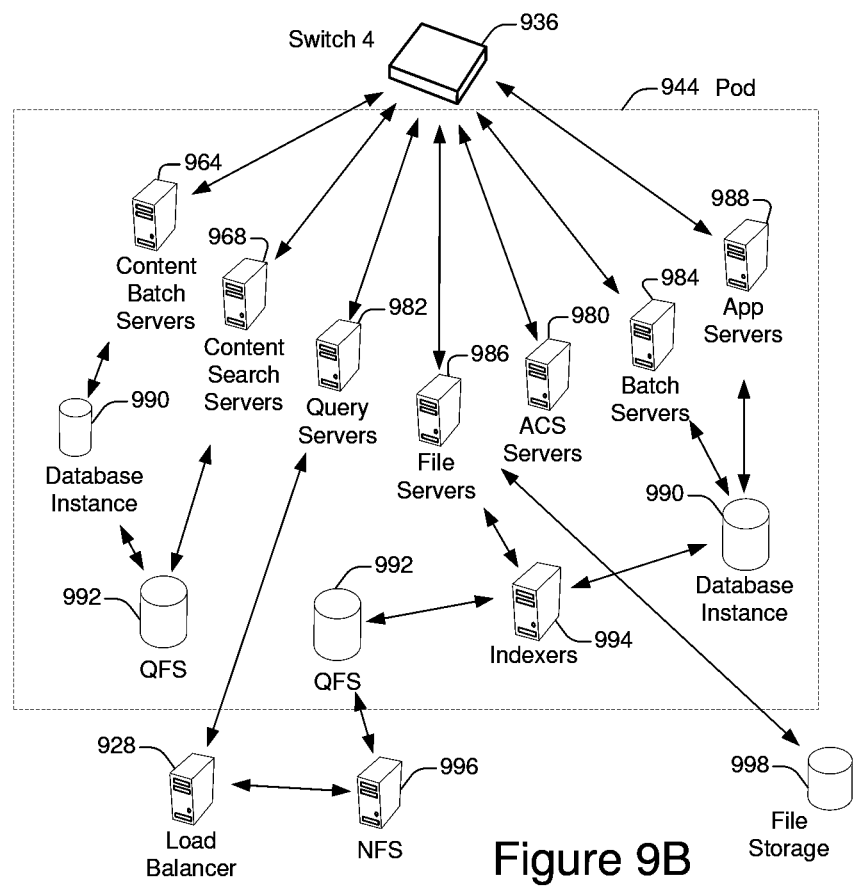
FIG. 9B shows a system diagram further illustrating an example of architectural components of an on-demand database service environment, in accordance with some implementations.

FIG. 9B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 8B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 9B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 7A, 7B, 8A and 8B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 7A and 7B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 7A, 7B, 8A and 8B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A computer-implemented online learning system, comprising:
a database system implemented using a server system, the database system configurable to cause:
processing an indication of a user selection, by a first user, of electronic learning content of an electronic learning (eLearning) system, the electronic learning content including a learning module tracked using one or more data objects maintained in a database of the database system, the indication of the user selection being received from a client device;
responsive to processing the indication of the user selection, initiating or resuming the learning module including:
generating or updating first metadata to indicate the initiation or resumption of the learning module, the first metadata stored in association with the one or more data objects used to track the learning module;
providing one or more of a plurality of content items of the learning module for presentation by the client device;
tracking progress of the first user in relation to completion of the learning module including:
generating or updating second metadata to indicate the progress of the first user, the second metadata stored in association with the one or more data objects used to track the learning module;
identifying an unanswered question that pertains to the learning module and that has been submitted by a second user, the identifying of the unanswered question including:
querying a community system storing user-generated communications to obtain the unanswered question from the user-generated communications, the querying and the obtaining being performed through a communications interface enabling communications between the eLearning system and the community system; and
providing the unanswered question for presentation on a web page of the learning module via the client device.

2. The computer-implemented online learning system as recited in claim 1, the database system further configurable to cause:
identifying, from third metadata stored in association with the one or more data objects used to track the learning module, one or more topics associated with the learning module; wherein the community system is queried for information pertaining to the identified one or more topics.

3. The computer-implemented online learning system as recited in claim 1, the database system further configurable to cause:
processing an answer, submitted by the first user, to the unanswered question submitted by the second user;
responsive to processing the answer, storing the answer in association with the unanswered question; and
transmitting an electronic communication including the answer to the second user or updating the web page to include at least one of: the answer submitted by the first user or metadata pertaining to the answer submitted by the first user.

4. The computer-implemented online learning system as recited in claim 1, wherein the community system is queried based, at least in part, on metadata indicating characteristics of the learning module.

5. The computer-implemented online learning system as recited in claim 1,
wherein the unanswered question is obtained from a plurality of questions based, at least in part, on metadata stored in association with the unanswered question.

6. The computer-implemented online learning system as recited in claim 1,
wherein the unanswered question is identified based, at least in part, on a plurality of user features of the first user, the plurality of user features comprising one or more of:
a first history of interaction of the first user with database records of the database system, a second history of interaction of the first user with services provided by the database system, a third history of interaction of the first user with feed items provided by the database system, the learning module with which the first user has interacted, an amount of the progress of the first user with respect to the learning module a further learning module that the first user has completed, a sequence of learning modules with which the first user has interacted, a further sequence of learning modules that the first user has completed, a credential or a certification that has been obtained by the first user, a degree of the first user, badges earned by the first user, a current job position of the first user, a prior job position of the first user, a set of skills of the first user, an amount of experience of the first user, a group of which the first user is a member, a particular user that the first user is following, a particular topic that is being followed by the first user, a topic page that has been accessed by the first user, a post of the first user that has been published, a further question that has been posted by the first user, an answer that has been posted by the first user, a number of answers that the first user has posted, a number of times that the first user has posted, a number of questions that the first user has posted, or a level of accuracy of the first user.

7. The computer-implemented online learning system as recited in claim 1, wherein tracking the progress of the first user in relation to completion of the learning module further comprises assessing an accuracy with which the first user completes an assessment of the learning module.

8. A computer-implemented method for dynamically providing computer-generated sequences of content including educational content, comprising:
processing an indication of a user selection, by a first user, of electronic learning content of an electronic learning (eLearning) system, the electronic learning content including a learning module tracked using one or more data objects maintained in a database of a database system, the indication of the user selection being received from a client device;
responsive to processing the indication of the user selection, initiating or resuming the learning module including:
generating or updating first metadata to indicate the initiation or resumption of the learning module, the first metadata stored in association with the one or more data objects used to track the learning module;
providing one or more of a plurality of content items of the learning module for presentation by the client device;
tracking progress of the first user in relation to completion of the learning module including:
generating or updating second metadata to indicate the progress of the first user, the second metadata stored in association with the one or more data objects used to track the learning module;
identifying an unanswered question that pertains to the learning module and that has been submitted by a second user, the identifying of the unanswered question including:
querying a community system storing user-generated communications to obtain the unanswered question from the user-generated communications, the querying and the obtaining being performed through a communications interface enabling communications between the eLearning system and the community system; and
providing the unanswered question for presentation on a web page of the learning module via the client device.

9. The computer-implemented method as recited in claim 8, further comprising:
identifying, from third metadata stored in association with the one or more data objects used to track the learning module, one or more topics associated with the learning module; wherein the community system is queried for information pertaining to the identified one or more topics.

10. The computer-implemented method as recited in claim 8, further comprising:
processing an answer, submitted by the first user, to the unanswered question submitted by the second user;
responsive to processing the answer, storing the answer in association with the unanswered question; and
transmitting an electronic communication including the answer to the second user or updating the web page to include at least one of: the answer submitted by the first user or metadata pertaining to the answer submitted by the first user.

11. The computer-implemented method as recited in claim 8, wherein the community system is queried based, at least in part, on metadata indicating characteristics of the learning module.

12. The computer-implemented method as recited in claim 8,
wherein the unanswered question is obtained from a plurality of questions based, at least in part, on metadata stored in association with the unanswered question.

13. The computer-implemented method as recited in claim 8,
wherein the unanswered question is identified based, at least in part, on a plurality of user features of the first user, the plurality of the user features comprising one or more of:
a first history of interaction of the first user with database records of the database system, a second history of interaction of the first user with services provided by the database system, a third history of interaction of the first user with feed items provided by the database system, the learning module with which the first user has interacted, an amount of the progress of the first user with respect to the learning module, a further learning module that the first user has completed, a sequence of learning modules with which the first user has interacted, a further sequence of learning modules that the first user has completed, a credential or a certification that has been obtained by the first user, a degree of the first user, badges earned by the first user, a current job position of the first user, a prior job position of the first user, a set of skills of the first user, an amount of experience of the first user, a group of which the first user is a member, a particular user that the first user is following, a particular topic that is being followed by the first user, a topic page that has been accessed by the first user, a post of the first user that has been published, a further question that has been posted by the first user, an answer that has been posted by the first user, a number of answers that the first user has posted, a number of times that the first user has posted, a number of questions that the first user has posted, or a level of accuracy of the first user.

14. The computer-implemented method as recited in claim 8, wherein
tracking the progress of the first user in relation to completion of the learning module further comprises assessing an accuracy with which the first user completes an assessment of the learning module.

15. A computer program product comprising computer-readable program code capable of being executed by one or more processors when retrieved from a non-transitory computer-readable medium, the program code comprising instructions configurable to cause:
processing an indication of a user selection, by a first user, of electronic learning content of an electronic learning (eLearning) system, the electronic learning content including a learning module tracked using one or more data objects maintained in a database of a database system, the indication of the user selection being received from a client device;
responsive to processing the indication of the user selection, initiating or resuming the learning module including:
generating or updating first metadata to indicate the initiation or resumption of the learning module, the first metadata stored in association with the one or more data objects used to track the learning module;
providing one or more of a plurality of content items of the learning module for presentation by the client device;
tracking progress of the first user in relation to completion of the learning module including:
generating or updating second metadata to indicate the progress of the first user, the second metadata stored in association with the one or more data objects used to track the learning module;
identifying an unanswered question that pertains to the learning module and that has been submitted by a second user, the identifying of the unanswered question including:
querying a community system storing user-generated communications to obtain the unanswered question from the user-generated communications, the querying and the obtaining being performed through a communications interface enabling communications between the eLearning system and the community system; and
providing the unanswered question for presentation on a web page of the learning module via the client device.

16. The computer program product as recited in claim 15, the instructions further configurable to cause:
identifying, from third metadata stored in association with the one or more data objects used to track the learning module, one or more topics associated with the learning module; wherein the community system is queried for information pertaining to the identified one or more topics.

17. The computer program product as recited in claim 15, the instructions further configurable to cause:
processing an answer, submitted by the first user, to the unanswered question submitted by the second user;
responsive to processing the answer, storing the answer in association with the unanswered question; and
transmitting an electronic communication including the answer to the second user or updating the web page to include at least one of: the answer submitted by the first user or metadata pertaining to the answer submitted by the first user.

18. The computer program product as recited in claim 15, wherein the community system is queried based, at least in part, on metadata indicating characteristics of the learning module.

19. The computer program product as recited in claim 15, wherein the unanswered question is obtained from a plurality of questions based, at least in part, on metadata stored in association with the unanswered question.

20. The computer program product as recited in claim 15, wherein the unanswered question is identified based, at least in part, on a plurality of user features of the first user, the plurality of the user features comprising one or more of:
a first history of interaction of the first user with database records of the database system, a second history of interaction of the first user with services provided by the database system, a third history of interaction of the first user with feed items provided by the database system, the learning module with which the first user has interacted, an amount of the progress of the first user with respect to the learning module, a further learning module that the first user has completed, a sequence of learning modules with which the first user has interacted, a further sequence of learning modules that the first user has completed, a credential or a certification that has been obtained by the first user, a degree of the first user, badges earned by the first user, a current job position of the first user, a prior job position of the first user, a set of skills of the first user, an amount of experience of the first user, a group of which the first user is a member, a particular user that the first user is following, a particular topic that is being followed by the first user, a topic page that has been accessed by the first user, a post of the first user that has been published, a further question that has been posted by the first user, an answer that has been posted by the first user, a number of answers that the first user has posted, a number of times that the first user has posted, a number of questions that the first user has posted, or a level of accuracy of the first user.

* * * * *